May 17, 1955      M. L. LOHREY      2,708,584
SIMULATED ANIMAL'S HEAD TO BE ATTACHED TO A PLAY VEHICLE
Filed March 17, 1951
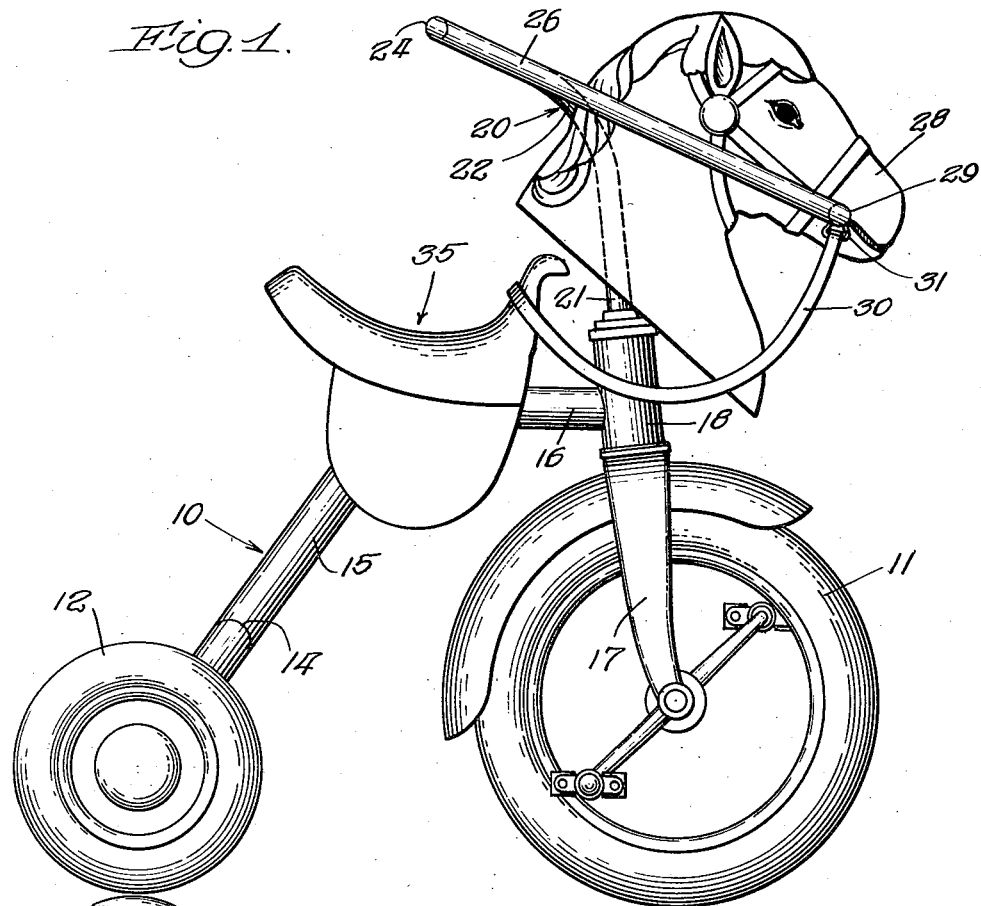
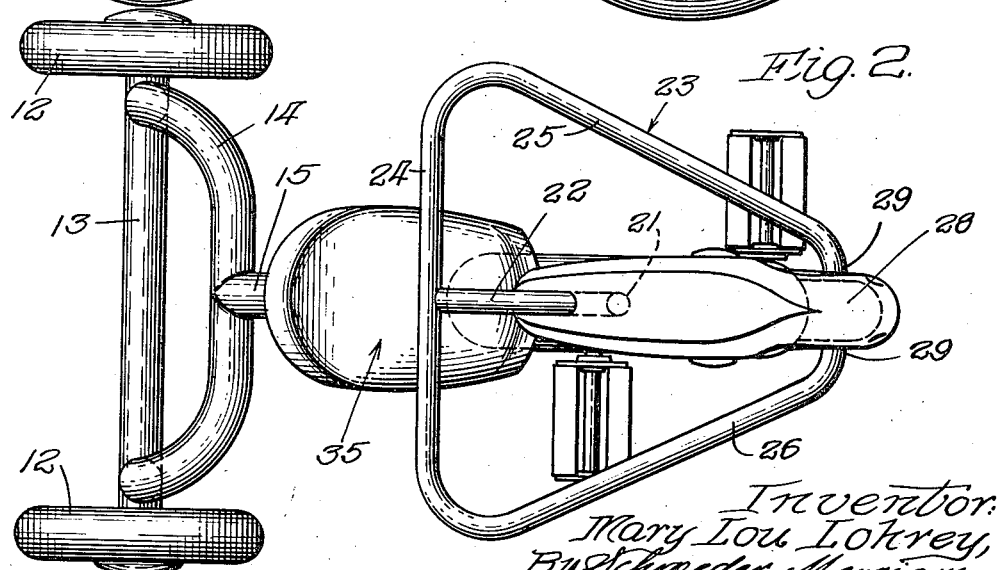

United States Patent Office 2,708,584
Patented May 17, 1955

2,708,584

SIMULATED ANIMAL'S HEAD TO BE ATTACHED TO A PLAY VEHICLE

Mary Lou Lohrey, Kansas City, Mo.

Application March 17, 1951, Serial No. 216,225

1 Claim. (Cl. 280—1.13)

This invention relates to a simulated animal's head for attachment to a play vehicle and more particularly to a simulated animal's head which is readily attachable to the steering column of such vehicle.

The affection which children have for animals of all kinds has long been recognized and understood. While many of the modern toys are replicas of modern vehicles, such as automobiles, trains, bicycles and the like, the phantasy of younger children is particularly enhanced by toys, such as hobby horses and the like, which simulate an animal rather than a mechanical contrivance.

The object of this invention is to produce a device which simulates an animal's head and yet which is readily securable to mechanical toys, such as bicycles, tricycles, wagons and the like. The invention is particularly adaptable for securing an animal's head, for example a horse's head, to a tricycle. The latter vehicle is one which almost every child possesses, and it has been found that when the device of this invention, in the form of a simulated horse's head, is attached to the tricycle the child becomes even more firmly attached to the toy and is able to engage in many games in which his tricycle assumes the likeness of a horse. The legendary cowboy has always been a hero to young children, and it has been found that a child has no difficulty whatsoever in assuming for himself the role of a cowboy when riding a tricycle equipped with the device of this invention, particularly if the child's equipment includes a cap pistol, a 10-gallon hat, or other cowboy accessories.

The invention will be described in conjunction with the accompanying drawings in which:

Fig. 1 is a side elevation showing a form of the invention secured to a child's tricycle, and Fig. 2 is a top plan view of the apparatus shown in Fig. 1.

While this invention is susceptible of embodiment in many different forms, there is shown in the drawings and will herein be described in detail one specific embodiment, with the understanding that the present disclosure is to be considered as an examplification of the principles of the invention and is not intended to limit the invention to the embodiment illustrated. The scope of the invention will be pointed out in the appended claims.

While the device of this invention may include a simulated head of many animals and may be attached to many forms of vehicle, it is shown in the drawings and will hereinafter be described in a form in which the head is a horse and the vehicle is a child's tricycle.

Referring now to the drawing, there is shown a tricycle 10 having the usual single front wheel 11 and a pair of rear wheels 12. The rear wheels are secured to an axle 13 to which a curved bracing bar 14 is fastened, the bracing bar carrying a first portion 15 of the frame which is connected at its upper end to a substantially horizontal second portion 16. At the juncture between the portions 15 and 16 there is provided the customary seat post for securing the usual tricycle seat to the frame.

The front wheel 11 is mounted between the open ends of a fork 17 which terminates in a hollow steering column rotatably received in a bearing 18 therefor constructed in the usual manner. Normally, a pair of handle bars are inserted into the steering column for turning the front wheel and guiding the vehicle.

The device of this invention is intended to take the place of the handle bars and thus serves not only as a means for simulating an animal but also as means for guiding the tricycle.

To this end the device includes a post generally designated 20 which has a first portion 21 insertable into the steering column for attachment thereto. The post is provided with a second portion 22 which is angularly displaced from the first portion 21 and extends rearwardly of the tricycle. Secured to the rear end of the portion 22 is a bracing means generally designated 23 which is in the form of a triangle having its base 24 secured to the rear end of the portion 22. The sides 25 and 26 of the triangular bracing means extend forwardly towards the front of the vehicle.

Secured to the post 20 is a simulated horse's head 28. The head itself is hollow and preferably made of sheet steel, the hollow being provided in order to permit insertion of the portion 21 into the steering column and to permit securing attachment in the usual manner to that column. The head is secured to the post 20 along the nape of the neck and either side of the mouth of the horse is secured to the bracing means at the apex 29 thereof as illustrated.

From the foregoing it can be seen that the device of this invention is readily attachable to the vehicle inasmuch as all that is necessary is to loosen the means (usually in the form of a screw) which secure the handle bars to the steering column and to insert the portion 21 therein in place of the handle bars. Tightening of the securing means completes the operation to transform the tricycle, in the mind of the child, into a horse. Steering of the tricycle is accomplished by means of the bracing means, thus the child can rest its hands and brace itself on the base portion 24 of the triangular bracing means.

A pair of reins 30 are secured to a buckle 31 simulating a bridle bit at the mouth of the horse. When riding the tricycle the reins can be grasped by the child along with the base portion 24. When not riding, it is possible to throw the reins over the horse's head and to lead the vehicle as one would lead a horse.

To augment further the illusion, the ordinary seat of the tricycle can be replaced with a seat 35 made in the shape of a Western saddle, the saddle may be secured to the seat post in the ordinary manner and secured to the frame in place of the usual tricycle seat.

Obviously the horse's head may be painted any number of colors in order to provide variety and the particular shape of the head chosen may be varied to simulate animals other than horses.

I claim:

A device of the character described to be attached to a tricycle having a hollow steering column to replace the handle bars thereof to convert the tricycle into a simulated animal comprising a rigid post having a first portion insertable in the steering column for attachment thereto and a second portion angularly displaced from the first portion to extend toward the rear of the tricycle therefrom, a hollow simulated horse's head secured to the post, and a substantially triangularly shaped rigid bracing means secured at its base to the second portion of the post and secured at its apex to both sides of the mouth of the head with the legs of the bracing means passing exteriorly on each side of the head, whereby the base of the bracing means provides a hand grip for steering the tricycle.

(References on following page)

References Cited in the file of this patent

UNITED STATES PATENTS

| | | |
|---|---|---|
| D. 156,038 | Ruppert | Nov. 15, 1949 |
| D. 164,758 | Bader | Oct. 9, 1951 |
| 381,038 | Stillman | Apr. 10, 1888 |
| 1,366,372 | Finley | Jan. 25, 1921 |
| 2,474,870 | Sheldon | July 5, 1949 |
| 2,527,684 | Moroney | Oct. 31, 1950 |
| 2,578,682 | Fernstrom | Dec. 18, 1951 |
| 2,617,658 | James et al. | Nov. 11, 1952 |

FOREIGN PATENTS

| | | |
|---|---|---|
| 753,570 | France | Aug. 12, 1933 |